US009015230B2

(12) United States Patent
Chen et al.

(10) Patent No.: US 9,015,230 B2
(45) Date of Patent: Apr. 21, 2015

(54) GATEWAY/SET TOP BOX IMAGE MERGING FOR DELIVERY TO SERVICED CLIENT DEVICE

(75) Inventors: Sherman (Xuemin) Chen, Rancho Santa Fe, CA (US); David Erickson, San Clemente, CA (US); Vladimir Silyaev, Laguna Niguel, CA (US); Alan Trerise, Los Gatos, CA (US); Marcus C. Kellerman, San Diego, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/114,314

(22) Filed: May 24, 2011

(65) Prior Publication Data

US 2012/0215833 A1    Aug. 23, 2012

Related U.S. Application Data

(60) Provisional application No. 61/445,683, filed on Feb. 23, 2011.

(51) Int. Cl.
*G06F 15/16* (2006.01)
*H04L 29/06* (2006.01)

(52) U.S. Cl.
CPC .......... *H04L 65/4084* (2013.01); *H04L 65/605* (2013.01)

(58) Field of Classification Search
CPC .................. H04L 65/4084; H04L 65/605
USPC ......... 709/203, 217, 219, 223, 246, 224, 231; 725/119
See application file for complete search history.

(56) References Cited

U.S. PATENT DOCUMENTS

| | | | |
|---|---|---|---|
| 2005/0034166 A1* | 2/2005 | Kim et al. ...................... | 725/119 |
| 2008/0120675 A1* | 5/2008 | Morad et al. .................. | 725/120 |
| 2011/0161400 A1* | 6/2011 | Silyaev et al. ................ | 709/203 |
| 2011/0161523 A1* | 6/2011 | Erickson et al. .............. | 709/247 |
| 2011/0314380 A1* | 12/2011 | Pritchett ........................ | 715/723 |
| 2012/0026278 A1* | 2/2012 | Goodman et al. .......... | 348/14.08 |
| 2012/0050507 A1* | 3/2012 | Keys .............................. | 348/56 |
| 2012/0075531 A1* | 3/2012 | Carroll et al. ................ | 348/584 |
| 2012/0215833 A1* | 8/2012 | Chen et al. ................... | 709/203 |

FOREIGN PATENT DOCUMENTS

KR    10-2004-0044208    5/2004

\* cited by examiner

*Primary Examiner* — Oanh Duong
(74) *Attorney, Agent, or Firm* — Garlick & Markison; Kevin L. Smith

(57) ABSTRACT

A gateway includes at least one communications interface and processing circuitry and establishes communications with at least one service provider device and with a serviced client device. The gateway receives serviced client device display structure instructions, first streamed content from a service provider device, and second streamed content from a cloud server, the second streamed content based upon an Internet session hosted by the cloud server. Based upon the serviced client device display structure instructions, the gateway combines the first streamed content with the second streamed content to form merged streamed content and transmits the merged streamed content to the serviced client device. In another operation the gateway forwards the first streamed content to a first client device and the second streamed content to a second client device based upon the serviced client device display structure instructions.

20 Claims, 11 Drawing Sheets

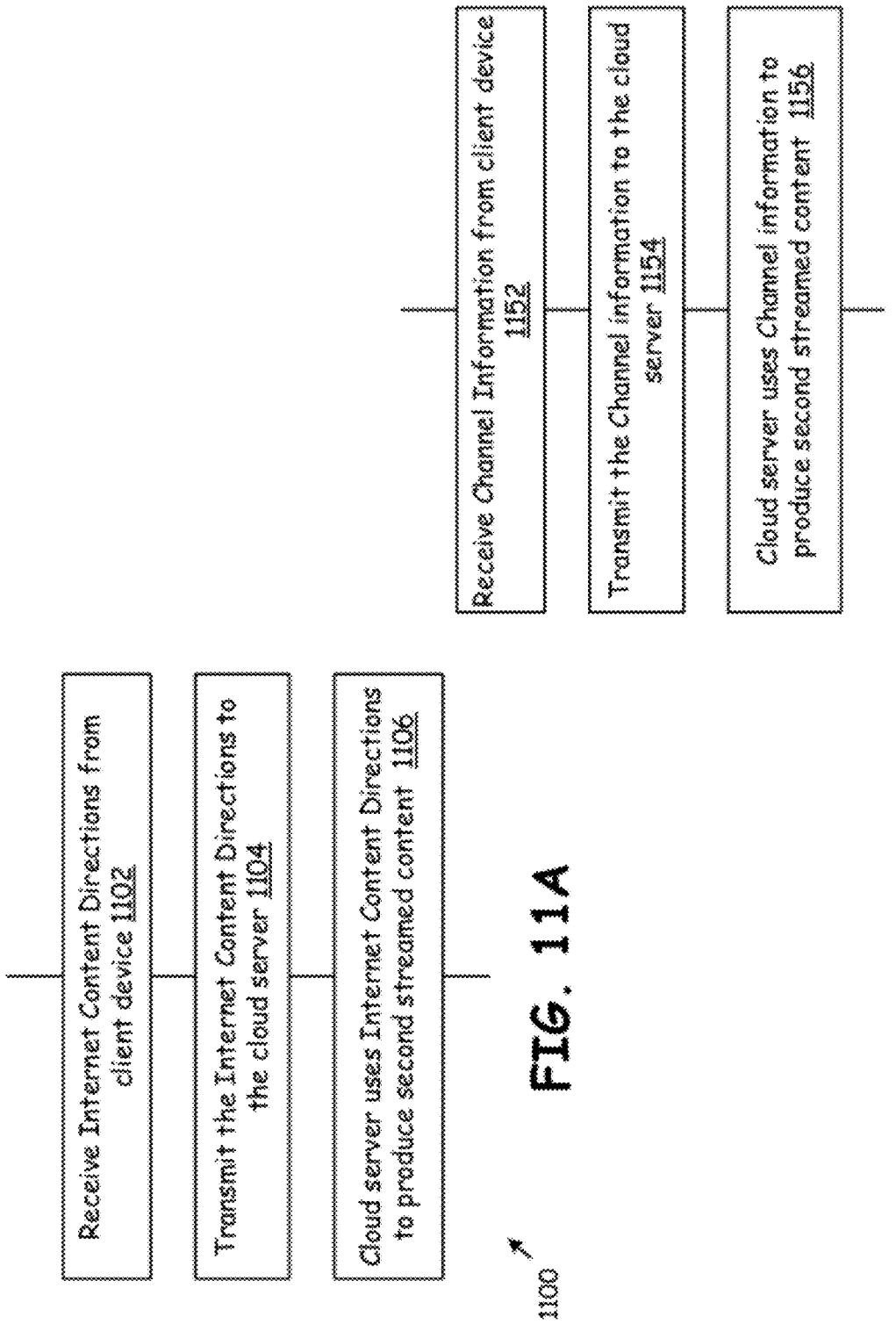

GATEWAY/SET TOP BOX IMAGE MERGING FOR DELIVERY TO SERVICED CLIENT DEVICE

CROSS-REFERENCE TO PRIORITY APPLICATION

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/445,683, entitled "Set Top Box (STB) that Supports Thin Clients and Interoperates with Internet Anywhere Cloud Server," filed Feb. 23, 2011.

BACKGROUND OF THE INVENTION

1. Field of the Invention

The present invention relates generally to electronic devices; and more particularly to streamed content delivery from/to and Internet Access of electronic devices.

2. Description of the Related Art

Multimedia systems in the home and within other premises are often times serviced by cable Set Top Boxes (STBs), satellite system STBs, and Digital Subscriber Line (DSL) STBs. These STBs now often service Internet Browsing activities of serviced devices. These serviced devices may be televisions, DVD players, portable media players, video games, and other types of client devices. Serviced devices may also include high functionality devices such as desktop computers, laptop computers, tablet computers and other high processing capacity devices. The STBs service Internet Browsing sessions for all serviced devices, independent of their processing abilities. Some of these processing devices have just enough processing capacity to service a web browser. However, as is generally known, web browsers are susceptible to viruses, malware, and other destructive content that are injected into the device during the Internet Browsing sessions. Processing devices without sufficient processing capacity to run protection software will become easily infected by such destructive content. Once this destructive content has infected one client computer it may wreak havoc with all client devices on the client side of a servicing STB. Further, the processing requirements of some web browser processes may exceed the processing abilities of the serviced devices, causing the web browsing process to partially or fully fail.

BRIEF DESCRIPTION OF THE DRAWINGS

FIG. 11A is a flow chart illustrating operations according to one or more embodiments of the present invention; and FIG. 11B is a flow chart illustrating operations according to one or more embodiments of the present invention.

DETAILED DESCRIPTION

Figure 1:
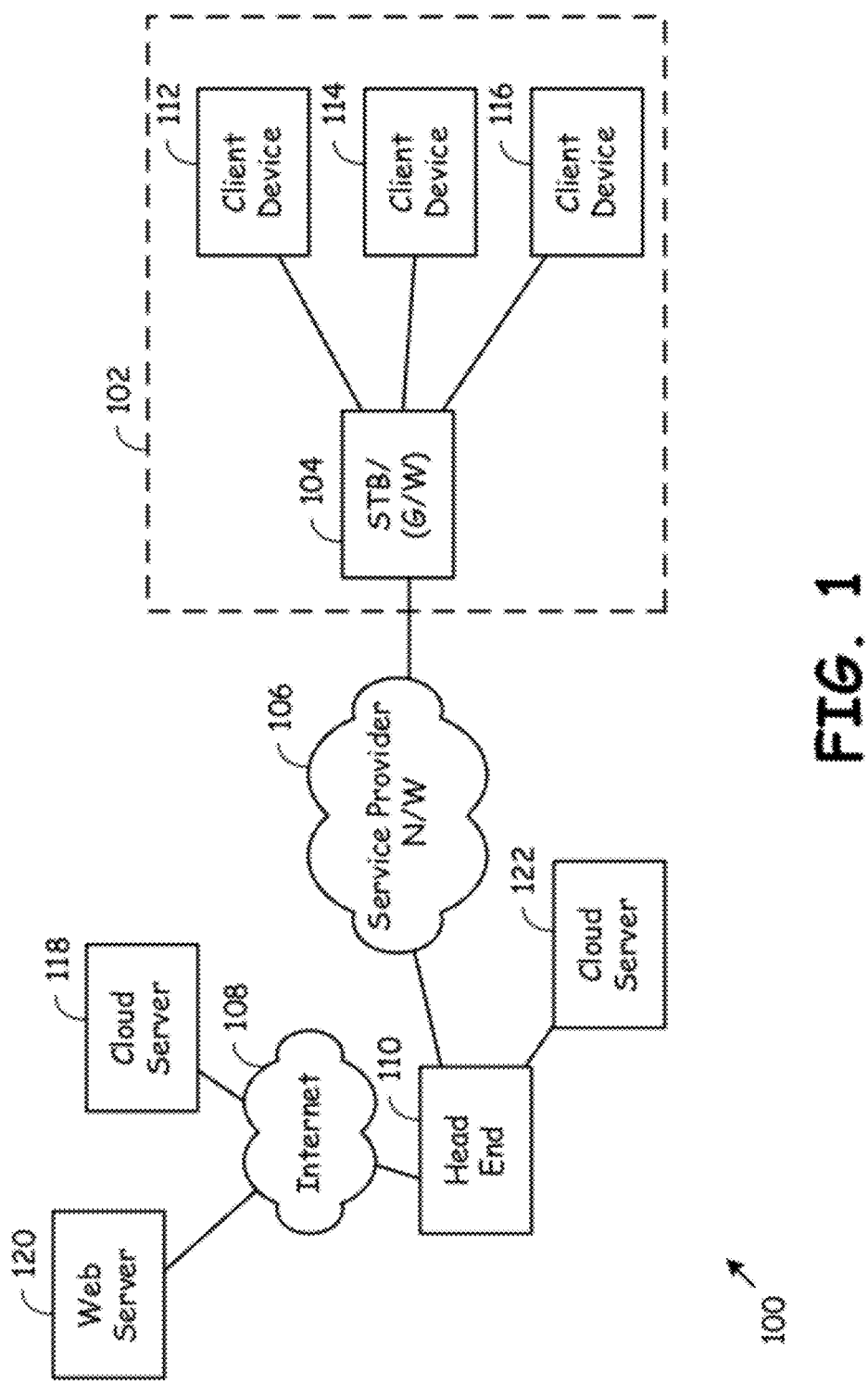
FIG. 1 is a block diagram illustrating a system constructed according to one or more embodiments of the present invention.

FIG. 1 is a block diagram illustrating a system 100 constructed according to one or more embodiments of the present invention. The system 100 is supported by an Internet Network 108 and includes a web server 120 coupled to the Internet 108, a cloud server 118 coupled to the Internet 108, a service provider head end 110 coupled to the Internet 108, a cloud server 122 coupled to the head end 110, and a service provider network 106 coupled to the head end. The service provider network 106 of FIG. 1 is one or more of a fiber network, a cable network, a telephone network, or another type network serviced by physical media.

A client site 102 includes a Set Top Box (STB) 104, referred to herein interchangeably as a Gateway (G/W), which services a plurality of client devices 112, 114, and 116 at a customer site, such as a home, office, or other customer setting. The client devices 112, 114, and 116 include one or more thin clients, the thin clients being televisions, video players, video game consoles, etc. The client devices 112, 114, and 116 may also include other devices that are not considered thin clients, such as desktop computers, laptop computers, tablet computers, etc. A thin client, as distinguished from a non-thin client, has limited processing capacity and limited memory.

Figure 2:
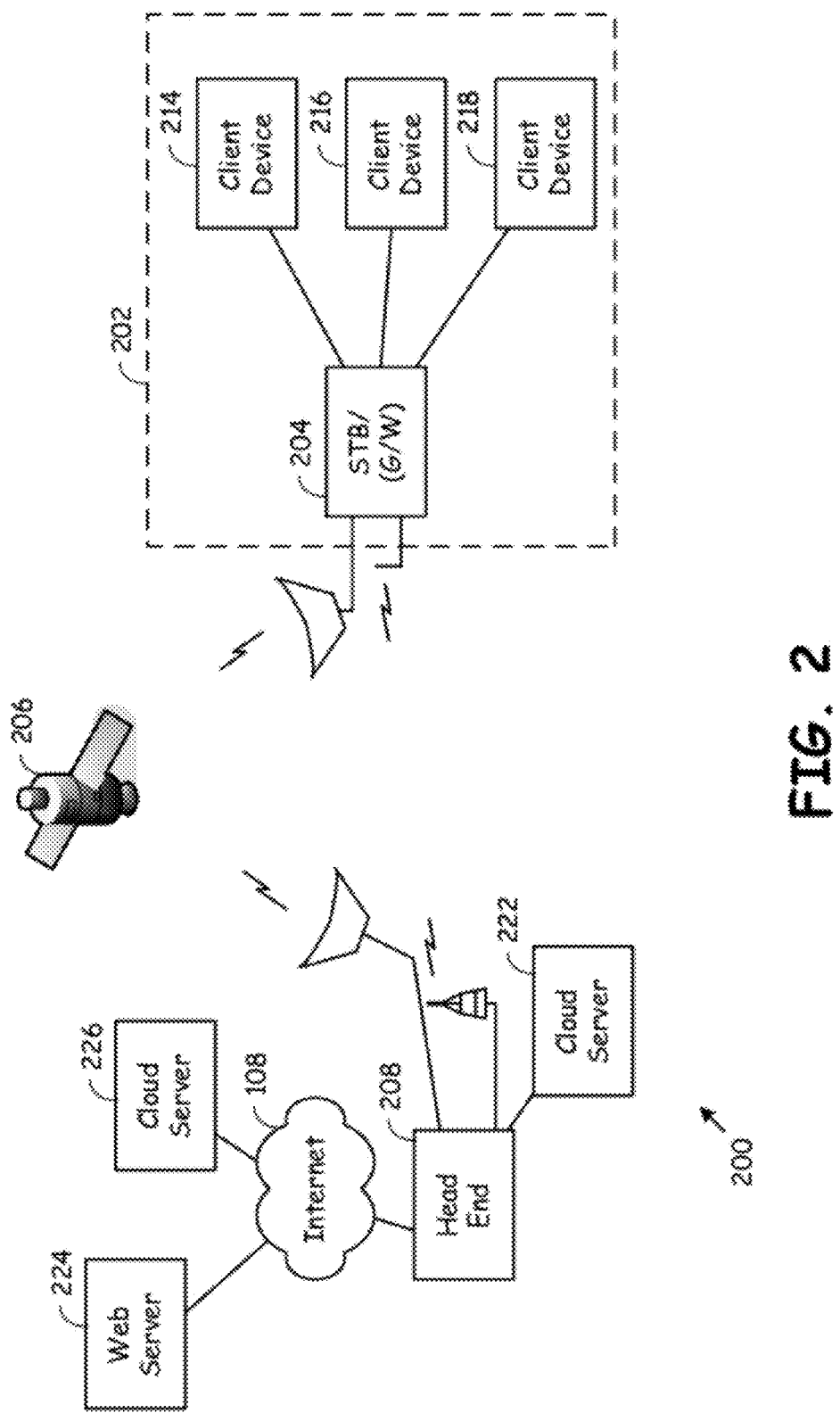
FIG. 2 is a block diagram illustrating a system constructed according to one or more other embodiments of the present invention.

FIG. 2 is a block diagram illustrating a system 200 constructed according to one or more other embodiments of the present invention. The system 200 of FIG. 2 is similar to the system 100 of FIG. 1, except that a head end 208 communicates with a STB 204/Gateway via one or more wireless links, as contrasted to the wired links of FIG. 1. With the structure 200 of the system of FIG. 2, as well as the structure of FIG. 1, the STB 204 services a plurality of client devices 214, 216, and 218. The wireless link may be serviced by satellite dishes and convey communications between the head end 208 and the STB 204 via a satellite 206. Alternately, the wireless link may be serviced by a point to point wireless link, a Wireless Local Area Network (WLAN), a Wireless Wide Area Network (WWAN), or another type of wireless link, e.g., 60 GHz, etc.

STB 204 serves at least client device 214, 216, and/or 218 (Television, Personal Media Player, game console, laptop computer, desktop computer, palm computer, etc.). Each of the STB 204 and client devices 214, 216, and/or 218 may have limited resources for web browsing, e.g., processing of content contained in web pages to render experience to users. Some client devices 214, 216, or 218 may not be able to interact with web servers at all because of their reduced processing capabilities, i.e., not able to service a web browser application.

The STB 204 may have the ability to service web browsing for one or more of the client devices 214, 216, and/or 218 but may also be resource limited, e.g., memory, communications, and/or processing limited. A primary function of the STB 204 is to provide video service to the client devices. It cannot fail to provide this service while providing web browsing services to the client devices 214, 216, and/or 218. Thus, even though it may have the processing capabilities to service an Internet browsing session, it may not be able to service such Internet browsing session without interfering with its other processing requirements.

A cloud server 222 (or 226) couples to or is accessible to a head end 208 of the service provider. The cloud server 222 interacts with the STB 204 or client device 214, 216, and/or 218 via the STB 204 to remotely service web browsing session(s) for one or more of the client devices 214, 216, and/or 218. The cloud server 226 interacts with the STB 204 (via the head end 208) to interface with a user of a client device 214, 216, and/or 218 to receive user input, i.e., keypad input, cursor input, voice input, etc. The cloud server 222 or 226 supports at least a portion of a web browser session for a client device. The cloud server 222 or 226 produces a video stream (H.264, MPEG, AVC, etc.) that is streamed to the client device 214, 216, and/or 218 via the head end 208 and the STB 204.

By placing browser functionality in the cloud server 222 or 226, processing workload for the STB 204 and/or client devices 214, 216, and/or 218 is substantially reduced. Further, the cloud server 222 or 226 is better able to protect a client device 214, 216, and/or 218 and STB 204 from dangers associated with web browsing, e.g., IP service attack, malware, viruses, etc. Content that is available to the client devices 214, 216, and/or 218 may be limited by the cloud server 222 or 226.

The structures illustrated in the systems 100 of FIG. 1 and 200 of FIG. 2 include devices that perform operations described further herein with reference to FIGS. 3-11. Each of the client devices 112-116 of FIG. 1 and 214-218 of FIG. 2 may be considered thin clients or non-thin clients. Thin clients have limited processing resources and cannot service all functions that a user may desire. A user may desire to have an image stream presented thereto that includes both normal video image content along with content produced via a web browsing session. Referring to client device 216 of FIG. 2, the client device 216 may be streamed a football game from head end 208 through STB 204. In such case, the client device 216 presents the streamed football game to a user of the client device 216. A user of the client device may desire to obtain web content from web server 224 and have the web content presented in conjunction with the football game. However, the client device 216 may have insufficient processing resources to instantiate a browser and/or to present as a composite the football game streamed image along with web browsing content.

According to one aspect of the present invention, the STB 204 or cloud server 226 merges multiple video streams into a composite streamed image and delivers the merged video stream for presentation by client device 216. These operations will be described further herein with reference to FIGS. 3-6. According to another aspect of the present invention, the cloud server 226 or STB 204 interacts with a user of client device 216 to present first streamed content upon client device 216 and related streamed content on another client device, such as client device 218. In such operation, for example, the user watches the streamed video corresponding to the football game on one client device 216, requests additional information via the client device 216, and the additional information is streamed to the second client device 218. In such case, the streamed content presented on the second client device may be related to the streamed content presented on the first client device 216. The second streamed content may be web browsing information selected by the client device 216 or by a user of the client device 216. Alternatively, the information presented to second client device 218 may be information that is selected via cloud server 226, web server 224, and/or STB 204. These operations will be described further with reference to FIGS. 10 and 11.

Particular structures of the systems 100 of FIG. 1 and 200 of FIG. 2 will be described further herein with reference to FIGS. 7, 8, and 9. The structure of an STB/gateway 104 or 204 will be described in particular with reference to FIG. 7, the structure of a cloud server 118 or a web server 120 will be described further herein with reference to FIG. 8, and the structure of a client device, e.g., 112, will be described further herein with reference to FIG. 9.

Figure 3:
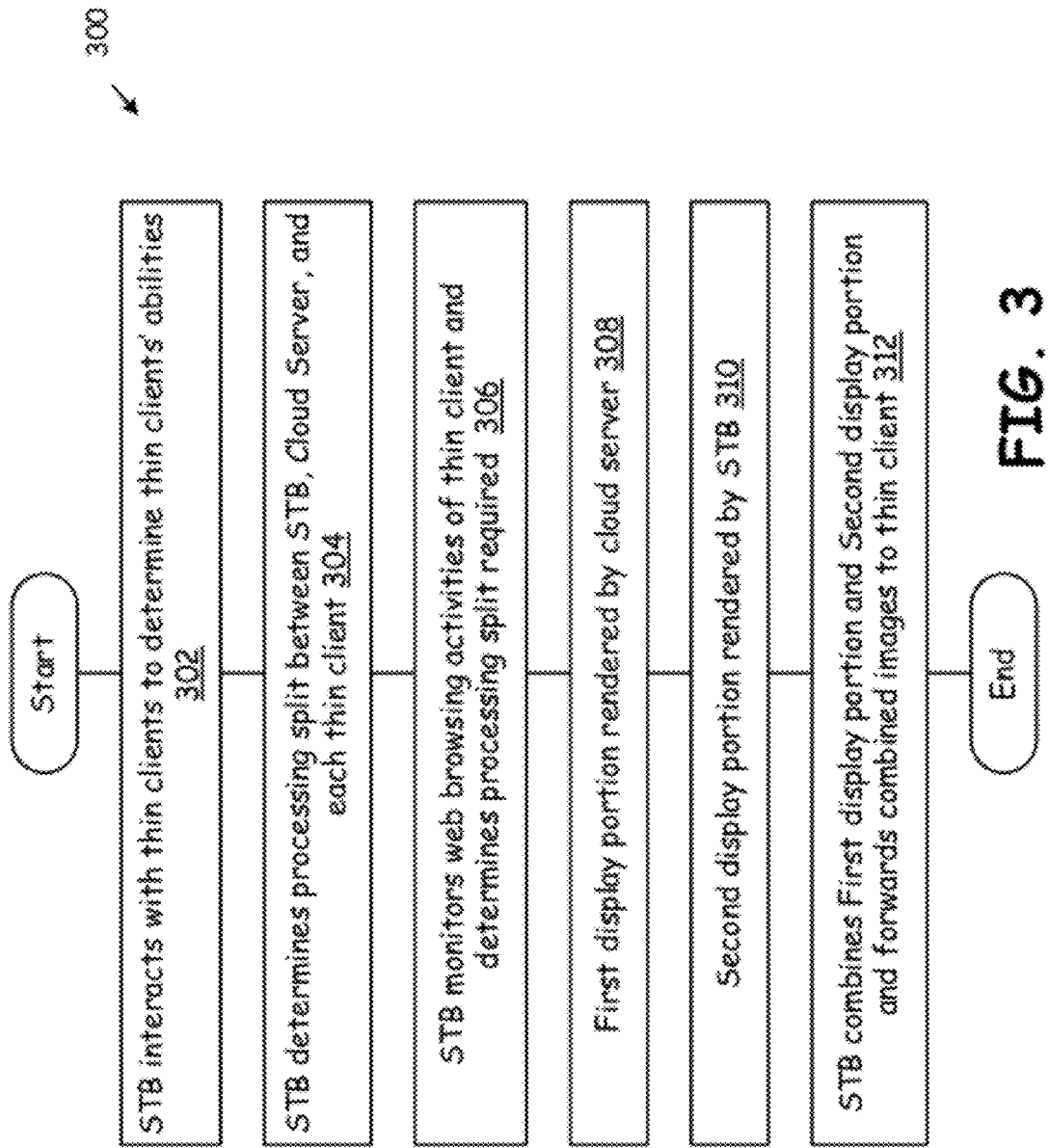
FIG. 3 is a flow chart illustrating operations according to one or more embodiments of the present invention.

FIG. 3 is a flow chart illustrating operations according to one or more embodiments of the present invention. With the operations 300 of FIG. 3, a full image presented to the client device by the STB includes a first portion generated by the STB from a video stream received from the head end and a second portion generated by the Cloud server. The Cloud server may have rendered the second portion from web page content received from a web server. The operations 300 of FIG. 3 commence with the STB interacting with its serviced clients to determine their particular abilities (Step 302). The STB then determines a general processing split between the STB, a Cloud Server, and each serviced client (Step 304). This general processing split may be based upon the client devices currently serviced activities, the STB's currently serviced activities, the client device's currently serviced activities, and other considerations. Then, the STB monitors the current web browsing activities of the client device, and based upon its previous determination determines a particular processing split required for the current browsing activities (Step 306). For the current web browsing activities of the client device, a first display portion of the web browsing experience of the client device is rendered by the Cloud Server (Step 308). A second display portion of the web browsing experience is then rendered by the STB (Step 310). The STB combines the first and second display portions into a single video stream and streams the combined video stream to the client device for display (Step 312).

Figure 4:
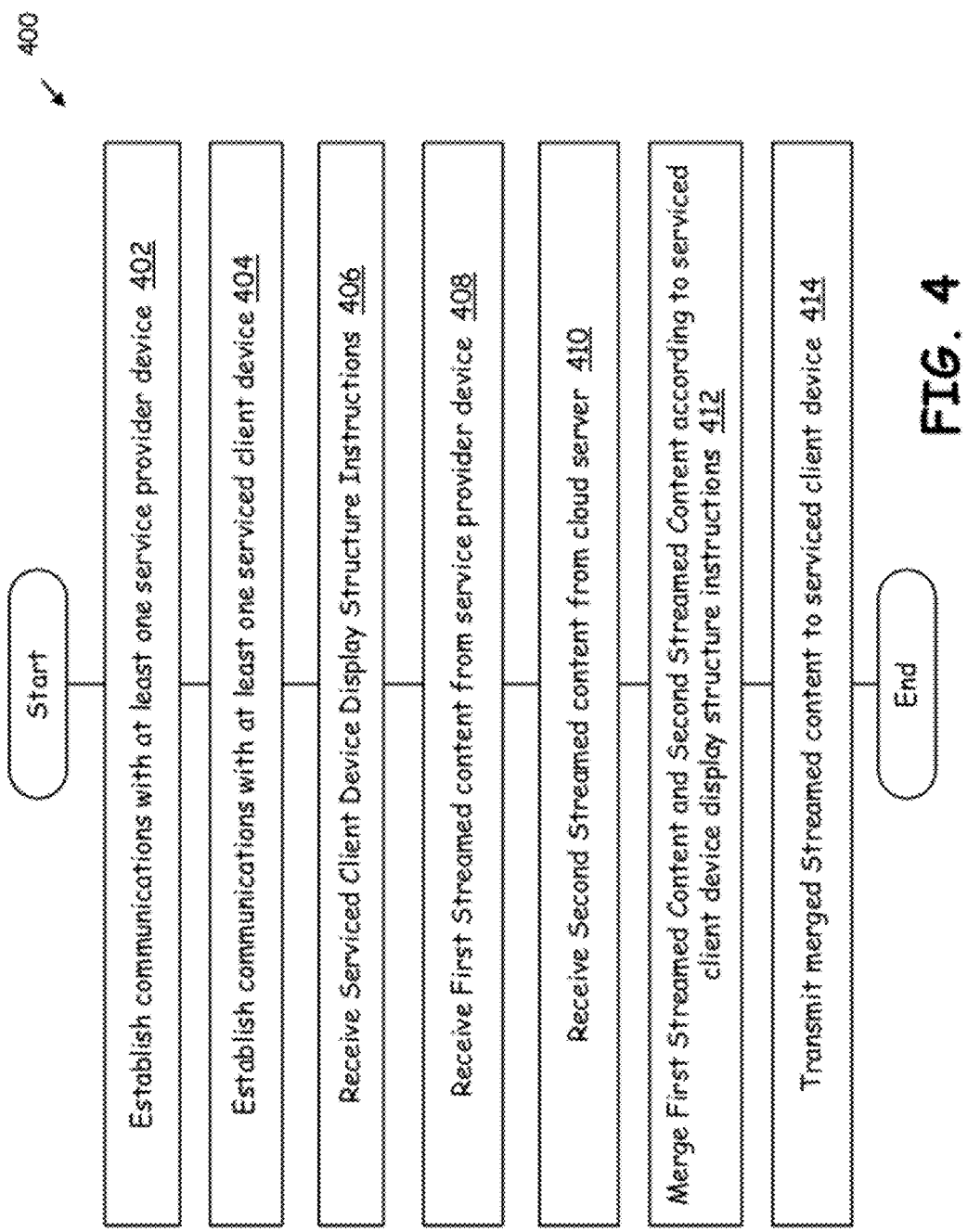
FIG. 4 is a flow chart illustrating operations according to one or more embodiments of the present invention.

FIG. 4 is a flow chart illustrating operations according to one or more embodiments of the present invention. The operations 400 of FIG. 4 commence with the STB or gateway establishing communications with at least one service provider device (Step 402). FIG. 4 will be described concurrently with the structure of the system 100 of FIG. 1. Thus in such case, the STB 104 establishes communications with head end 110, cloud server 122, cloud server 118, and/or web server 120 via the service provider network and Internet 108.

Next, the STB 104 establishes communications with at least one serviced client device (Step 404). The serviced client device may be client device 112, client device 114, and/or client device 116 of FIG. 1. Then, the STB 104 receives serviced client device display structure instructions (Step 406). These serviced client device display structure instructions may be received from a client device, the head end 110, a web server 120, and/or cloud server 118 or 122.

The serviced client device display structure instructions will be used later for generating composite streamed video images.

Then, the STB 104 receives first streamed content from a service provider device (Step 408). In such case, the STB 104 may receive a streamed football program from head end 110 via service provider network 106. Next, the STB 104 receives second streamed content from a cloud server 122 (Step 410). The second streamed content may relate to the first streamed content based upon, for example, user instructions via client device 114, STB operations, channel that the client device is being streamed via the STB 104, from a web server 120, or via another source.

Figure 5:
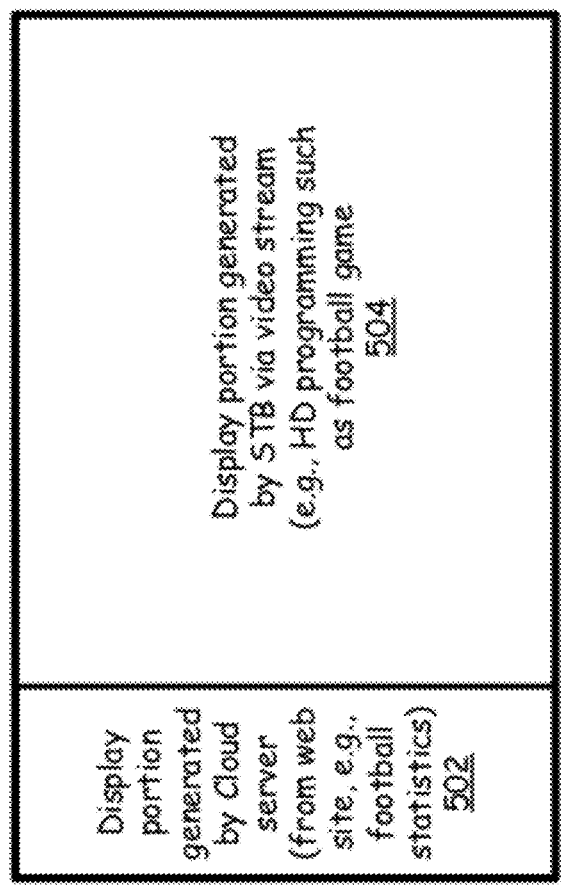
FIG. 5 is a block diagram illustrating a composite streamed image constructed according to one or more embodiments of the present invention consistent with the operations of FIG. 4.
Figure 6:
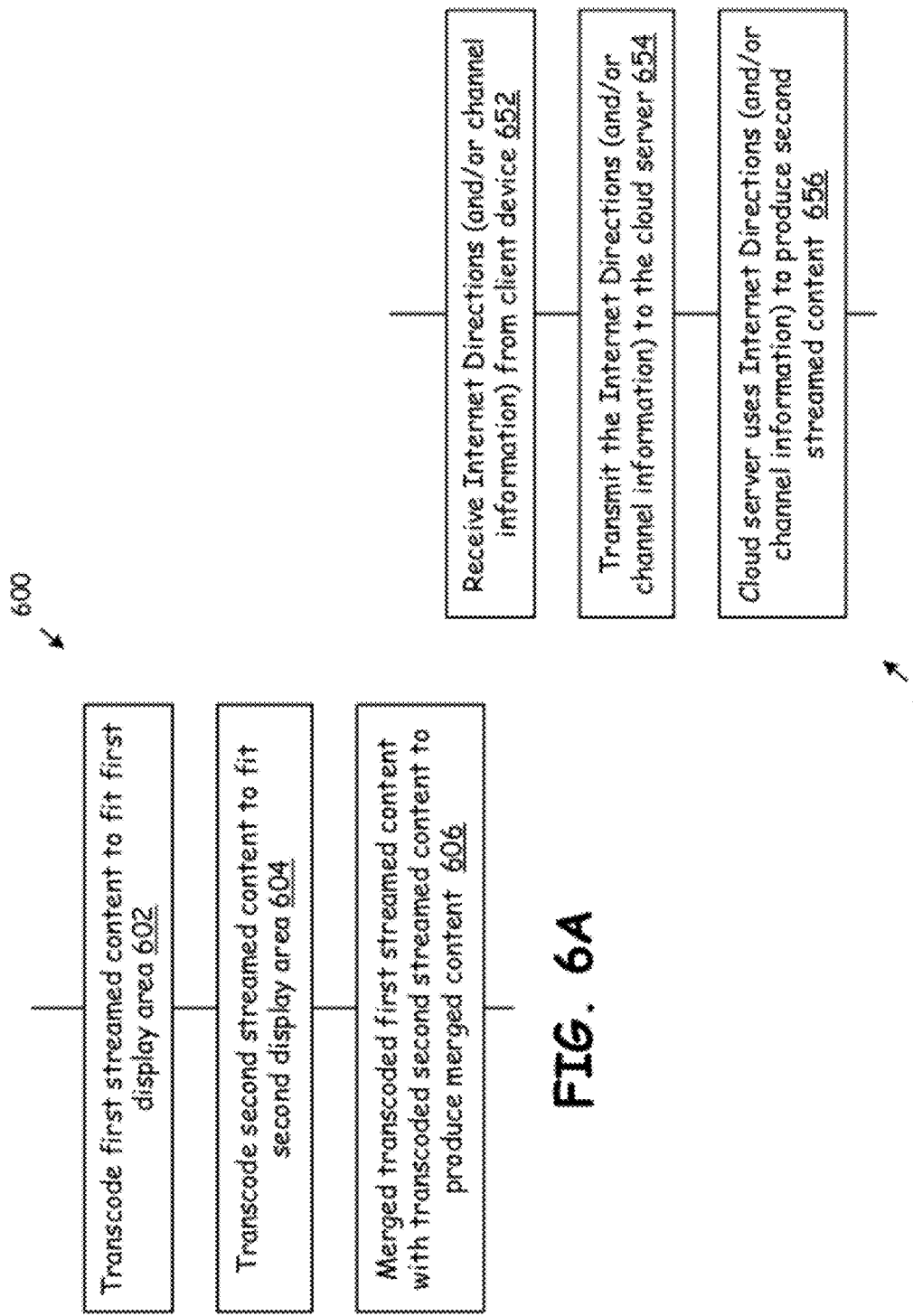
FIG. 6A is a flow chart illustrating operations according to one or more embodiments of the present invention.
FIG. 6B is a flow chart illustrating operations according to one or more embodiments of the present invention.

Next, the STB or gateway 104 merges the first streamed content and the second streamed content according to the serviced client device display structure instructions (Step 412). One example of such merging is illustrated in FIG. 5. However, other examples of the manner in which the first streamed content and the second streamed content are merged by the STB 104 may differ. For example, the streamed content may be merged such that the first streamed content is in an upper portion of the display while the second streamed content is at a lower portion, left and right portions, inset portions, or other manners in which multiple video images may be merged. Finally, the STB 104 transmits the merged streamed content to the serviced client device 114 (Step 414). From Step 414, operation ends.

FIG. 5 is a block diagram illustrating a composite streamed image constructed according to one or more embodiments of the present invention consistent with the operations of FIG. 4. With the example of FIG. 5, the cloud server renders the content on the left portion of the display from a web page and forwards the rendered video stream to the STB. The cloud server directs the STB to render the other portion and notifies the STB of how to combine the video stream decoded by the STB and the video stream rendered by the cloud server. The STB performs the combining and forwards the combined image to the client device.

As shown in FIG. 5, a first display portion 504 is generated by the STB 104 via video streamed content received from head end 110 via service provider network. With the prior example of the football game, the first display portion corresponds to the first streamed content and is displayed on a right hand portion 504 of the merged frame.

The second streamed content is located in a left portion 502 of the merged display. With the example of FIG. 5, the second streamed content corresponds to a web browsing session hosted by cloud server 122 and corresponds to a web session established with web server 120. With the example of FIG. 5, the data or information that is displayed in the second portion display 502 includes football statistics that are related to the football game being displayed in the first displayed portion 504. In such case, the channel that is being watched by the user of client device 114 may be fed by the STB 104 or head end 110 to cloud server 122. Cloud server 122 then establishes a web browsing session to capture statistics corresponding to the football game being watched on the channel as reported. In such case, there may be default operation by cloud server 122 to collect default statistics for presentation with the streamed football game content. Alternatively, a user of client device 114 may have logged onto cloud server 122 and/or web server 120 or otherwise stored his or her preferences with regard to the second streamed content before or during the viewing of the football game. In such case, the user may access a web page that allows a user to enter information regarding what he or she would like to view while watching the football game. The statistics presented to the user in the left portion 502 of the display may relate to his or her preference with regard to the teams being watched, particular players, the offense, the defense, or other unique characteristics of the football game being viewed in the first display portion 504.

The second display portion 502 may be viewed, moved, or removed based upon input received from a user of the client device 114. In such case, the preferences are relayed from client device 114 to STB 104 via user input or control, control commands, or other control input. In such case, while presenting the first display portion 504, the STB 104 may, based upon user input, either present the second display portion 502, or not. Thus, the structure of the display in FIG. 5 may be altered over time. Further, as was previously described, the structure of FIG. 5 is an example only in many varying different structures for presentation of the first streamed content and second streamed content may be enacted within a display area presented on client device 114.

FIG. 6A is a flow chart illustrating operations according to one or more embodiments of the present invention. The operations 600 include first transcoding the first streamed content to fit the first display area (Step 602). As is known, streamed content received from head end 110 by STB 104 may be received in an HD format that includes full resolution corresponding to client device 114. This full resolution video may not fit correctly the aspect ratio of the first display area 504 of FIG. 5. Thus, according to the operations 600 of FIG. 6A, the STB 104 transcodes the first streamed content to fit the first display area 504 of the display structure of FIG. 5. Operations 600 of FIG. 6A continues with the STB 104 transcoding the second streamed content to fit the second display area (Step 604). The operations of Step 604 of FIG. 6A may be employed to provide video so that it fits the second display area 502 illustrated in FIG. 5. Then, the STB 104 merges the transcoded first streamed content with the transcoded second streamed content to produce the merged content (Step 606). The merged streamed content includes correctly proportioned or aspect ratioed representations of the first streamed content and the second streamed content so that they are correctly displayed within the first 504 and second 502 display areas of the screen structure of FIG. 5.

The operations 600 of FIG. 6A (and the operations 500 of FIG. 5) may vary over time during display of the first and second streamed content. In such case, the portions of the display area that are occupied by the first and second streamed content in their transcoded formats may be altered based on user or other input. Further, the second streamed content may from time to time be excluded from display on the client device 114. In such case, the second streamed content would be not merged with the first streamed content, and the first streamed content may be directly passed by the STB 104 as it is received from head end 110.

FIG. 6B is a flow chart illustrating operations according to one or more embodiments of the present invention. The operations 650 of FIG. 6B commence with the STB 104 receiving Internet directions (and/or channel information) from client device 114 (Step 652). The STB 104 then transmits the Internet directions (and/or channel information) to the cloud server 122 (Step 654). The Internet directions are those that direct the cloud server 122 to initiate a web browsing session hosted thereon based upon the desires of the client device.

The cloud server 122 then uses the Internet directions (and/or channel information) to produce the second streamed content (Step 656). In such case, the cloud server 122 instantiates a web browsing session based upon user input received via client device 114 and passed via STB 104, service provider network 106, head end 110, and the Internet 108 to the cloud server 122. The cloud server 122 then establishes an Internet browsing session based upon the Internet directions or channel information to produce the second streamed content. The second streamed content is then provided to STB 104 for merging with the first steamed content and presentation to the serviced client device 114, for example, a format illustrated previously and described with reference to FIG. 5.

Figure 7:
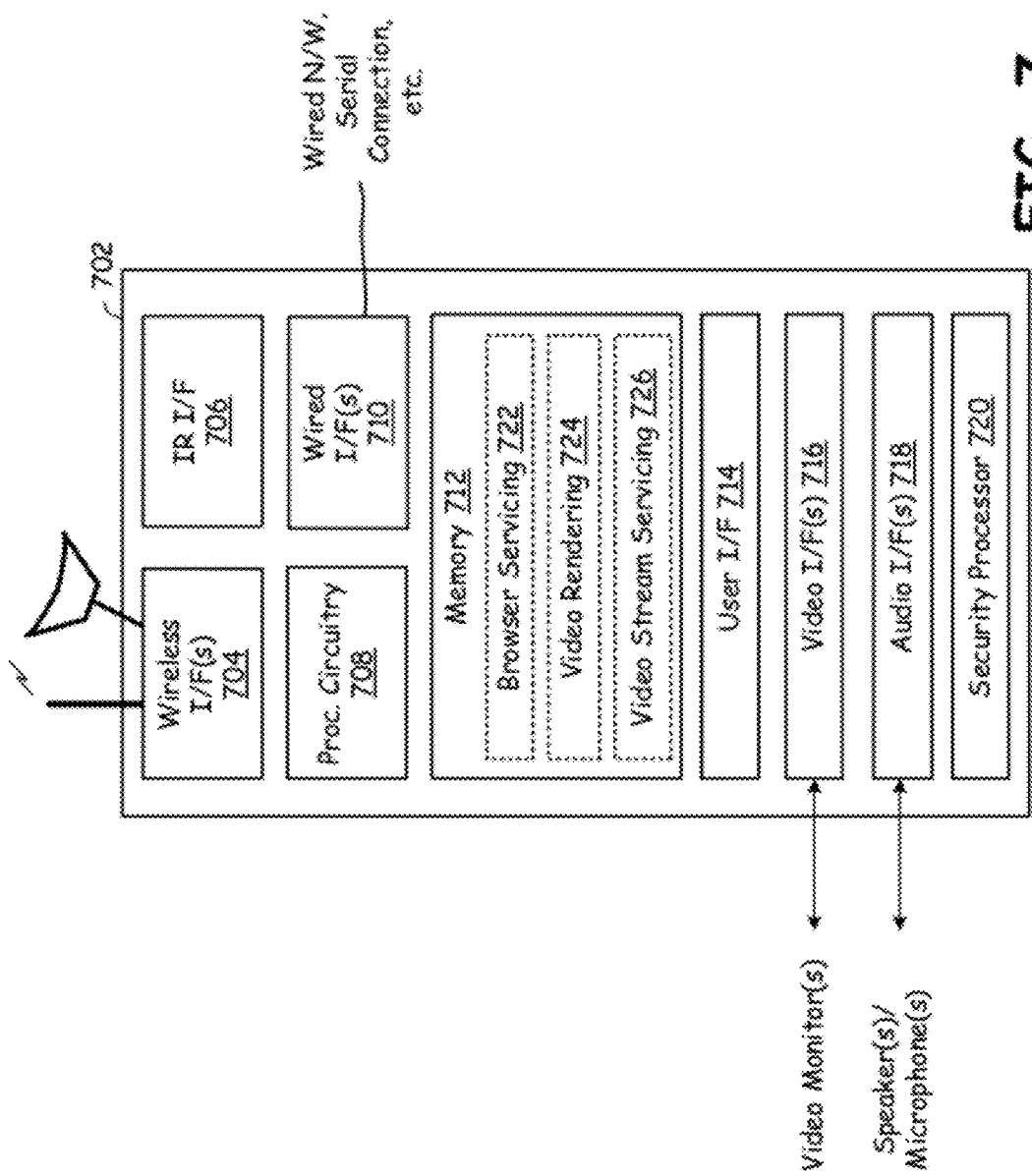
FIG. 7 is a block diagram illustrating a Set Top Box/Gateway constructed according to one or more embodiments of the present invention.

FIG. 7 is a block diagram illustrating a Set Top Box/Gateway 702 constructed according to one or more embodiments of the present invention. The STB 702 of FIG. 7 includes a wireless interface 704, an infrared interface 706, processing circuitry 708, one or more wired interfaces 710, and memory 712. The STB 702 typically would also include a user interface 714, at least one video interface 716, at least one audio interface 718, and may include a security processor 720. The wireless interfaces 704 support wireless communications with one or more wireless networks, including WLAN networks, WPAN networks, WWAN networks, satellite networks, and may also support communications with wireless serviced client devices. This wireless interface 704 may service communications consistent with cellular network standards, WPAN standards such as the Bluetooth standard, WLAN standards as IEEE 802.11x standards, WWAN standards such as the WiMAX standard, and/or another type of wireless communication standards. The IR (Infrared) interface 706 supports IR communications with remote controls and client devices. The IR communications may support an industry standard or proprietary communications protocol.

The processing circuitry 708 may include one or more of a system processor, a digital signal processor, a processing module, dedicated hardware, an application specific integrated circuit (ASIC), or other circuitry that is capable of executing software instructions and for processing data. The memory 712 may be RAM, ROM, FLASH RAM, FLASH ROM, optical memory, magnetic memory, or other types of memory that is capable of storing data and/or instructions in allowing processing circuitry to access same. The wired interfaces 710 may include a DSL interface, a USB interface, a fire wire interface, a serial interface, a parallel interface, an optical interface, or another type of interface supported by a media that is copper, metal, or optical.

The user interface 714 may include keypad, video display, cursor control, touch pad, or other type of interface that allows a user to interface with the STB 702. The video interface 716 couples the STB 702 to one or more video monitors. The communications link between the video interface 716 and the video monitor(s) may be an HDMI interface, a composite video interface, component video interface, an S-video interface, or another type of video interface supported by both the video monitor and the STB 702. The audio interface 718 couples the STB 702 to speakers and/or microphones for audio content delivery and receipt. The video camera/video camera interface 716 may include an onboard video camera or may couple the STB 702 to an external video camera. The security processor 720 provides security operations for the STB 702. The STB 702 supports the operations described with reference to FIGS. 1-6B. Client devices previously described herein have structure similar to the STB 702 but may have lesser processing capabilities. In supporting these operations, computer instructions for browser servicing 722, video rendering 724, and video stream servicing 726 may be stored in memory 712.

Figure 8:
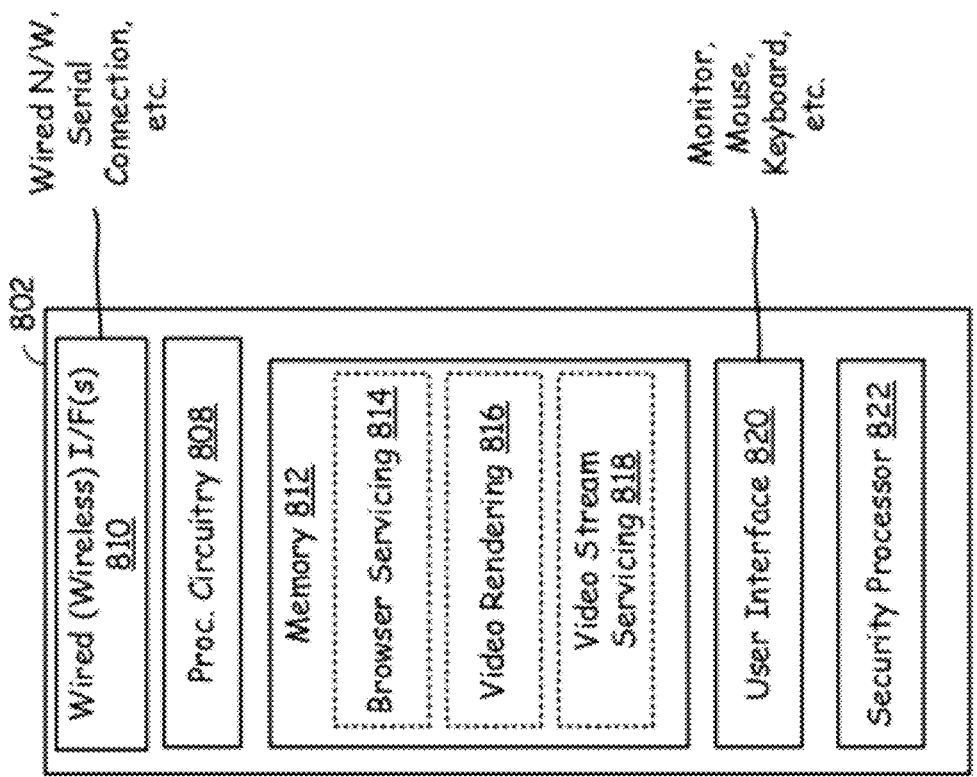
FIG. 8 is a block diagram illustrating a cloud server constructed according to one or more embodiments of the present invention.

FIG. 8 is a block diagram illustrating a cloud server constructed according to one or more embodiments of the present invention. The cloud server 802 of FIG. 8 includes one or more wired or wireless interfaces 810. Each of these wired or wireless interfaces services data communications via a corresponding communication link. The wired interface may service coaxial communications, optical communications, or another type of wired communication that may provide high throughput for a particular connection. The wireless interface may be a WLAN interface, a satellite interface, a WWAN interface, or another type of wireless interface.

The processing circuitry 808 may include one or more processing units selected from, for example, system processors, reduced instruction set computing processors, digital signal processors, ASICs, custom logic, field programmable gate arrays, or another type of processing device that is capable of executing software instructions and processing digital data. Memory 812 includes one or more of RAM, ROM, DRAM, DROM, optical memory, flash RAM, magnetic memory, or another type of memory capable of storing software instructions and data. User interface 820 interfaces the cloud server to a user via a monitor, a keyboard, mouse, and other types of user input devices. The cloud server may also include a security processor 822 that operates to guarantee that the software on the cloud server 802 is secure and that communications between the cloud server 802 and a remote device are also secure.

According to various embodiments of the present invention, the memory 812 stores specialized computer instructions to service the various operations supported by the cloud server 802. In particular, the memory 812 stores browser servicing instructions 814, video rendering instructions 816, and video stream servicing instructions 818. The browser servicing instructions 814 service an Internet browsing session when the cloud server 802 instantiates a browser to service the Internet browsing needs of one or more serviced client devices. Video rendering instructions 816 allow the cloud server 802 to render video stream representative of a service Internet browsing session. Further, video stream servicing instructions 818 stored in memory 812 allow the cloud server to stream the video representing the browser session instantiated by the cloud server.

Figure 9:
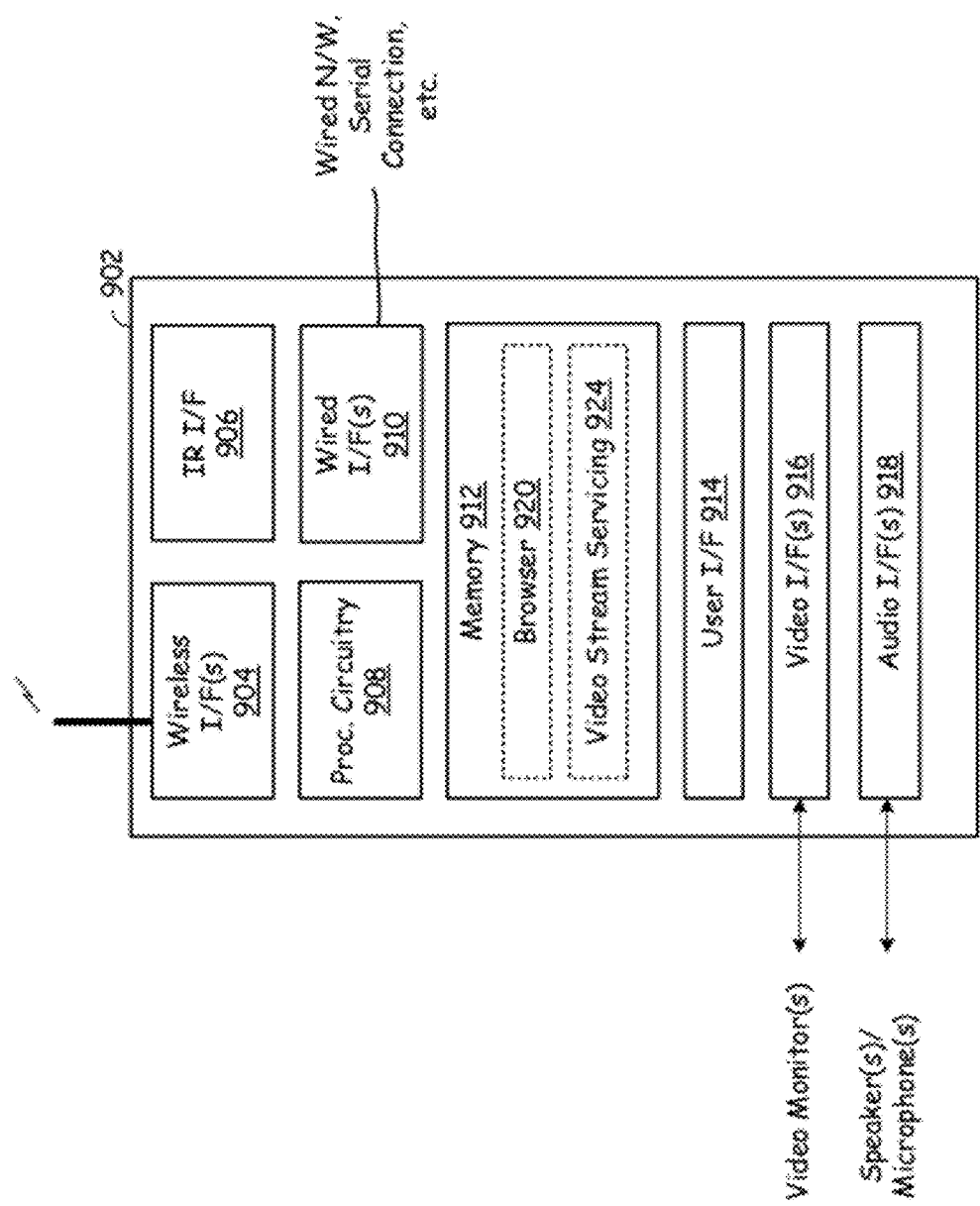
FIG. 9 is a block diagram illustrating a client device constructed according to one or more embodiments of the present invention.

FIG. 9 is a block diagram illustrating a client device constructed according to one or more embodiments of the present invention. A client device 902 of FIG. 9 may be one or more of a laptop computer, desktop computer, notepad computer, digital video player, or another type of device. Thin clients would have fewer resources than would other types of clients that operate according to the present invention. The client device 902 may include a wireless interface 904, an infrared interface 906, and/or one or more wired interfaces 910. The client device 902 includes processing circuitry 908 which includes one or more processors and may include system processors, risk processors, digital signal processors, custom logic, FPGAs, A6, or other types of processing circuitry that are capable of executing software instructions and processing digital data.

Memory 912 may be RAM, ROM, flash RAM, flash ROM, magnetic memory, optical memory, or another type of memory that is capable of storing computer instructions and data. The client device 902 may include one or more user interfaces 914, one or more video interfaces 916, and one or more audio interfaces 918. According to the present invention, the memory 912 stores software instructions that include browser instructions 920 and video stream servicing instructions 924. The browser instructions 920 are those that, when executed, cause the client device 902 to instantiate a browser for an Internet browsing session upon the client device 902. The video stream servicing instructions 924 include instructions capable of receiving a video stream and presenting the video stream to the user via the video interface 916 and the audio interface 918. Further, these instructions 920 and 924 and/or other instructions are capable to allow a user to interface with the client device 902 to provide browsing input via the user interface 914.

Figure 10:
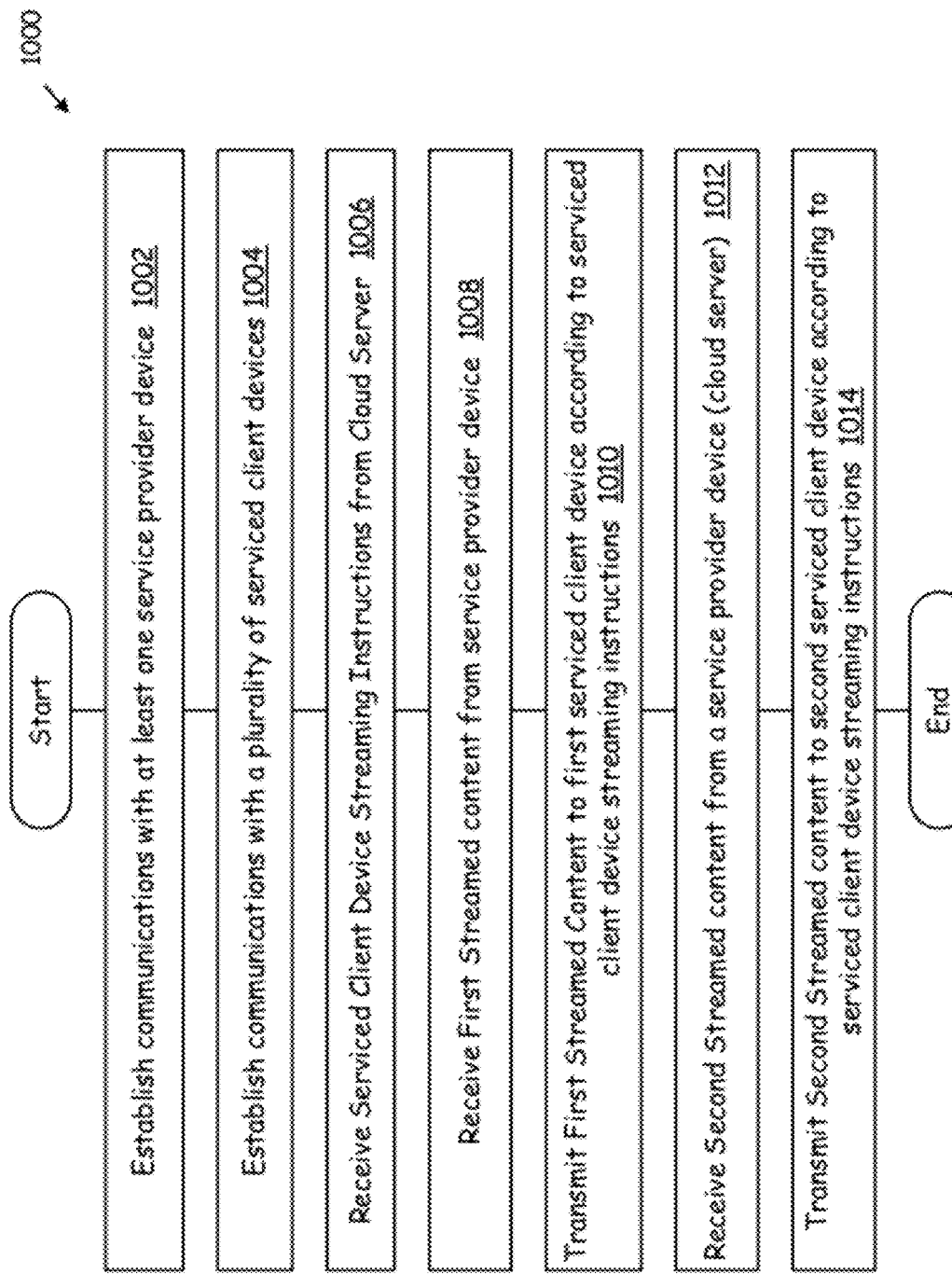
FIG. 10 is a flow chart illustrating operations according to one or more embodiments of the present invention.

FIG. 10 is a flow chart illustrating operations according to one or more embodiments of the present invention. The operations 1000 of FIG. 10 commence with the STB 104 establishing communications with at least one service provider device, such as head end 110, cloud server 118, cloud server 122, and/or web server 120 (Step 1002). The STB 104 then establishes communication with a plurality of serviced client devices (Step 1004). The serviced client devices may include client device 112, 114 and/or 116.

Operations 1000 continue with the STB 104 receiving serviced client device streaming instructions from a cloud server 118 (Step 1006). The serviced client device streaming instructions relate to the manner in which the cloud server 118 is directed to produce second streamed content for the client device 114. The STB 104 then receives first streamed content from a service provider device (Step 1008). The first streamed content, using the example previously described herein, may be video corresponding to a televised football game. Next, the STB 104 transmits the first streamed content to the first client device 114 according to the serviced client device streaming instructions (Step 1010). The first streamed content would be the video stream corresponding to the televised football game and displayed upon the client device 114.

Operation continues with the STB 104 receiving second streamed content from the service provider device, e.g. cloud server 118 (Step 1012). The second streamed content may be based upon an Internet browsing session established by the cloud server 118 in conjunction with web server 120. The cloud server 118 creates a streamed video program corresponding to the Internet browsing session in an H.264 video format, for example (Step 1012). The streamed video format may be MPEG or another format as well. The STB 104 then transmits the second streamed content to a second serviced client device, e.g. client device 116, according to the serviced client device streaming instructions (Step 1014). The second streamed content is related to the first streamed content. Further, the instructions for streaming the second streamed content would be received from the first serviced client device 114 and provided to STB 104. In such case, a user may be watching a football game on a large screen television and receive statistics for the football game, information regarding the football game, or other desired information via a second client device, which may be a cell phone, a laptop computer, a desktop computer, or another device that the user desires upon which to receive such information. The second streamed content would also be streamed video delivered in H.264, mpeg, or another streaming video format.

FIG. 11A is a flow chart illustrating operations according to one or more embodiments of the present invention. The operations 1100 commence with the STB 104 receiving Internet content directions from a client device 114 (Step 1102). The STB 104 then transmits the Internet content directions to cloud server 118 (Step 1104). The cloud server 118 then uses the Internet content directions to produce the second streamed content (Step 1106). Using again the example of the streamed football game and the related information, the Internet content directions may include input received via a user of client device 114 using a template received from the cloud server 118. The user may be provided with a template at client device 114 that is used by cloud server to effectively collect information for the related Internet browsing session. The cloud server 118 then uses the Internet content directions to initiate a web browsing session to produce the second streamed content.

FIG. 11B is a flow chart illustrating operations according to one or more embodiments of the present invention. The operations 1150 of FIG. 11B commence with the STB 104 receiving channel information from client device 114. The STB 104 may already have the channel information as opposed to having retrieved such channel information from client device 114 at Step 1152. The STB 104 then transmits the channel information to the cloud server 122 for use by the cloud server (Step 1154). The cloud server 122 then uses the channel information to produce the second streamed content (Step 1156).

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a gateway having at least one communications interface and processing circuitry, the method comprising:
   establishing communications with a service provider device;
   establishing communications with a serviced thin client device having thin client characteristics;
   receiving serviced thin client device display structure instructions by at least one of the serviced thin client device, the service provider device, and a cloud server;
   receiving streamed content from the service provider device;
   receiving an Internet browsing session content hosted by the cloud server, wherein the cloud server collects information from the serviced thin client device via a template in relation to an Internet browsing session to produce the Internet browsing session content;
   combining the streamed content with the Internet browsing session content per the serviced thin client device display structure instructions to form merged streamed content accommodating thin client functionality; and
   transmitting, by the gateway, the merged streamed content to the serviced thin client device, wherein the serviced client device is configured to generate a composite streamed video image from the merged streamed content.

2. The method of claim 1, wherein the merged streamed content includes the streamed content located in a first display area and the Internet browsing session content located in a second display area adjacent the first display area.

3. The method of claim 2, further comprising transcoding the streamed content to fit the first display area.

4. The method of claim 3, further comprising transcoding the Internet browsing session content to fit the second display area.

5. The method of claim 1, further comprising:
   receiving Internet content directions from the client device; and
   transmitting the Internet content directions to the cloud server, wherein the Internet content directions are used by the cloud server to produce the Internet browsing session content.

6. The method of claim 1, further comprising transmitting channel information regarding the streamed content to the cloud server, wherein the channel information is used by the cloud server to produce the Internet browsing session content.

7. The method of claim 1, wherein the serviced thin client device display structure instructions are received from the cloud server.

8. The method of claim 1, wherein the serviced thin client device display structure instructions are received from the serviced thin client device via the cloud server.

9. A gateway comprising:
   at least one communications interface; and
   processing circuitry coupled to the at least one communications interface and operable to cause the gateway to:
      establish communications with a service provider device;
      establish communications with a serviced thin client device having thin client characteristics;
      receive serviced thin client device display structure instructions by at least one of the serviced thin client device, the service provider device, and a cloud server;
      receive streamed content from the service provider device;
      receive an Internet browsing session content hosted by the cloud server, wherein the cloud server collects information from the serviced thin client device via a template in relation to an Internet browsing session to produce the Internet browsing session content;
      combine the streamed content with the Internet browsing session content per the serviced thin client device display structure instructions to form merged streamed content accommodating the thin client characteristics; and
      transmit the merged streamed content to the serviced thin client device, wherein the serviced thin client device is configured to generate a composite streamed video image from the merged streamed content.

10. The gateway of claim 9, wherein the merged streamed content includes the streamed content located in a first display area and the Internet browsing session content located in a second display area adjacent the first display area.

11. The gateway of claim 10, wherein the processing circuitry is further operable to transcode the streamed content to fit the first display area.

12. The gateway of claim 11, wherein the processing circuitry is further operable to transcode the Internet browsing session content to fit the second display area.

13. The gateway of claim 9, wherein the processing circuitry is further operable to:
   receive Internet content directions from the client device; and
   transmit the Internet content directions to the cloud server, wherein the Internet content directions are used by the cloud server to produce the Internet browsing session content.

14. The gateway of claim 9, wherein the processing circuitry is further operable to transmit channel information regarding the streamed content to the cloud server, wherein the channel information is used by the cloud server to produce the Internet browsing session content.

15. The gateway of claim 9, wherein the serviced thin client device display structure instructions are received from the cloud server.

16. The gateway of claim 9, wherein the serviced thin client device display structure instructions are received from the serviced thin client device.

17. A method for operating a gateway, the method comprising:
   establishing communication with a service provider device;
   establishing communication with a serviced thin client device having thin client characteristics;
   receiving serviced thin client device display structure instructions by at least one of the serviced thin client device, the service provider device, and a cloud server;
   receiving streamed content from the service provider device;
   receiving an Internet browsing session content hosted by the cloud server, wherein the cloud server collects information from the serviced thin client device via a template in relation to an Internet browsing session to produce the Internet browsing session content;
   combining the streamed content with the Internet browsing session content per the serviced thin client device display structure instructions to form merged streamed content accommodating the thin client characteristics; and
   transmitting the merged streamed content to the serviced thin client device, wherein the serviced thin client device is configured to generate a composite streamed video image from the merged streamed content based on the serviced thin client device display structure instructions.

18. The method of claim 17, wherein the merged streamed content includes the streamed content located in a first display area and the Internet browsing session content located in a second display area substantially adjacent the first display area.

19. The method of claim 18, further comprising transcoding the streamed content to fit the first display area.

20. The method of claim 19, further comprising transcoding the Internet browsing session content to fit the second display area.

* * * * *